(12) United States Patent
Chaput

(10) Patent No.: US 7,327,951 B2
(45) Date of Patent: Feb. 5, 2008

(54) INSTANT WATER HEATER WITH PTC PLASTIC CONDUCTIVE ELECTRODES

(76) Inventor: Ivanhoe Chaput, 13701 S. Gramercy Pl., Gardena, CA (US) 90249

(*) Notice: Subject to any disclaimer, the term of this patent is extended or adjusted under 35 U.S.C. 154(b) by 243 days.

(21) Appl. No.: 11/111,670

(22) Filed: Apr. 21, 2005

(65) Prior Publication Data
US 2006/0239664 A1    Oct. 26, 2006

(51) Int. Cl.
*F24H 1/10* (2006.01)

(52) U.S. Cl. ........................... 392/493; 392/311

(58) Field of Classification Search ............ None
See application file for complete search history.

(56) References Cited

U.S. PATENT DOCUMENTS

| | | | |
|---|---|---|---|
| 1,017,874 A * | 2/1912 | Kelso | 392/311 |
| 1,596,869 A * | 8/1926 | Claret | 392/311 |
| 3,025,385 A * | 3/1962 | Tanaka | 219/50 |
| 6,593,843 B1 * | 7/2003 | Becker et al. | 338/22 R |
| 6,640,048 B2 | 10/2003 | Novotny et al. | |
| 6,879,440 B2 | 4/2005 | Becker et al. | |
| 6,987,440 B2 * | 1/2006 | Becker et al. | 338/22 R |
| 7,190,886 B2 * | 3/2007 | Dubicki et al. | 392/326 |
| 2002/0177644 A1 * | 11/2002 | Blok | 524/425 |
| 2004/0006867 A1 * | 1/2004 | Becker et al. | 29/610.1 |
| 2006/0000823 A1 * | 1/2006 | Truckai et al. | 219/505 |
| 2006/0204231 A1 * | 9/2006 | Choi et al. | 392/311 |

* cited by examiner

*Primary Examiner*—Thor Campbell
(74) *Attorney, Agent, or Firm*—Donald D. Mon

(57) ABSTRACT

An instant water heater utilizing positive temperature coefficient plastic electrically conductive material structures for electrodes. The heating of the water is not generated by the electrodes, but instead by the resistance of the water to the electrical current flowing between them. The material of the electrodes undergoes a phase change at certain temperatures when whereby it converts from electrically conductive to electrically non-conductive at a predetermined temperature. The output temperature of the water is determined by a combination of the area of the electrodes that confront one another, the water's conductivity, the flow rate of the water and the current limiting capability of the conductive electrode materials positive temperature coefficient, which reduces or stops the heating of the water when the intended water temperature is achieved.

11 Claims, 11 Drawing Sheets

INSTANT WATER HEATER WITH PTC PLASTIC CONDUCTIVE ELECTRODES

FIELD OF THE INVENTION

An instant water heater which heats water flowing between two immersed electrodes.

BACKGROUND OF THE INVENTION

This invention relates to water heaters of the type which heat water that flows between two electrodes, rather than by providing a hot element which is contracted by the water. In this invention, the water is heated by electrical current flowing through the water when the water is between the two electrodes.

So called "instant" water heaters differ from conventional water heaters by their lack of a storage tank for hot water. Instead of heating and storing water for future usage, instant water heaters accept cold or cool water, heat it, and deliver it directly to the user point on demand. Such heaters find their most common usage in sink faucets, showers and tubes although they can be provided for any other usage that requires hot water.

Among their advantages is that they can be placed very near to the use point. Pipes of substantial length need not be emptied of cold water before hot water arrives from a central source for example. Also, it is much easier to run an electrical circuit to a distant heater than to provide a distant tank, or a long pipe to convey hot water from a central source to a distant use point.

Legionnaire's Disease is well known as a consequence of water stored for long periods at moderate temperature. Having no storage of the water at all profoundly reduces risk of such disease.

Presently-known instant water heaters do have major disadvantages, including short product life, dry-fire burn-out, short service life, liability to water damage, moderate rates of flow, high energy consumption, and release of metal ions into the water.

Another disadvantage of existing instant water heaters is their inability to accommodate varying input voltages and amperage along with water flow that matches their intended use. A complaint often heard is that the wrong instant water heater was purchased from among many different models. The necessary wide range of variables, such as voltage and circuit breaker amperage, and service flow in gallons is simply too confusing for many customers.

It is yet another disadvantage of existing instant water heaters that they often burn out or break coils due to water hammering, air in the water lines, or current overloads. These pose an electrical danger from direct contact of live broken coil ends to the water. The electrical current passes directly into the water. Manifolds that are connected to ground with a grounding wire corrode, and it is only a matter of time before a corroded manifold or a burned out coil releases a full current into the water and out a faucet or other plumbing fixture when in use, to the risk of the user.

It is a disadvantage of conventional electrode water heaters to have to contend with the wide variation of water conductivity of drinking water, both in the United States and in other parts of the world. Water conductivity is measured in microsiemens, which is the same as micro mhos. Mhos are the inverse of ohms, and therefore represent the conductive characteristics of water, which absorbs more power as it becomes more conductive. Water conductivity in the United States can range from 50 microseimens to over 1,500 microsiemens. Foreign countries can have as high as 1,800 microsiemens.

The disadvantage occurs when their electrodes must be sized such that they are capable of attaining satisfactory performance with 50 microsiemen water, but must then regulate a potentially hazardous 30 times the current draw when the water is at 1,500 microsiemens. For example, an electrode water heater on a 50-amp breaker must attain an acceptable performance of 40 degrees of temperature rise from its cold water inlet to its hot water outlet. If the water is conductive to 50 microsiemens and the heater passes 1 gallon per minute, the power required is 26.8 amps at 220 VAC. In this case, there is no disadvantage to using an electrode since this is below the current rating of its 50-amp breaker. If, for example the water conductivity is 1,500 microsiemens, the potential load would then become 804 amps. This power must be regulated to below the 50-amp circuit breaker and more specifically, to the 26.8 amps to meet the 40-degree temperature rise at 1 gallon per minute. The condition is exacerbated when 3 gallons per minute are required. The potential current draw for the flow rate is a staggering, 2,400 amps.

Since prior to this invention, electrodes could not be resized on the fly, regulating this amount of power has been costly. Typically, the common approach to electrode water heaters design is to use triacs, IGBT's, mosfets and other sine wave chopping devices to regulate the high current so that the circuit breakers do not trip. For low power requirements such as light dimmers, this is the preferred and inexpensive method. However, to regulate the high current potentials of electrode water heaters, these methods are economically and technically unacceptable.

It is yet another disadvantage of electrode water heaters that suggest methods of power regulation using said wave-chopping devices, that such devices can introduce harmonics in the line and heat the wiring without tripping the circuit breaker. Wires can become extremely hot, causing serious fire hazard. One solution to this disadvantageous condition is called "current matching". However, current matching for electrode water heaters and boilers is nearly impossible to accomplish with such a widely varying electrical load without mechanically moving the electrodes as is done in large, expensive industrial electrode boilers. To do this in a home appliance such as an instant water heater would be too costly and would introduce wear parts that would greatly increase the failure modes of the device.

Yet another disadvantage of electronically regulating high current via AC wave chopping is the electromagnetic emissions that disrupt communications television signals and create radio static interference. These emissions are not allowed in Europe's "Flicker Standard" and can violate FCC regulations.

It is another disadvantage of electrode water heaters that in order to match the load to the line without the said expensive sine wave chopping devices, the preferred method is to physically move the electrodes via electric motors. This is done to either increase their relative distance from each other, or to pull them upward leaving less of the electrode submersed, hence reducing their surface area disposed in water.

It is an object of this invention to provide an electrode water heater whose current draw is passively and automatically regulated without chopping the sinusoidal AC electrical power which heretofore was necessary to regulate 1,500 amps, or more, down to within the required amperages of household circuit breakers.

It is another object of this invention to provide this regulation with no moving parts.

It is yet another object of this invention to accomplish this regulation with no electronic components such as triacs, IGBT's or mosfets sized to accommodate the high currents mentioned.

It is another object of the invention to regulate water temperature to an acceptable temperature by utilizing the merits of a Positive Temperature Coefficient conductive material that becomes a non-conductive at a preset temperature, and, where necessary, utilizing less expensive state of the art electronic technology for a finer temperature setting.

It is another objective of this invention to regulate water temperature by way of the water transferring its heat into the Positive Temperature Coefficient material, and rendering it, or some varying portion thereof non-conductive.

It is yet another objective of the invention to regulate a high inrush of current by way of the material's electrical resistance heating itself from within so that it, or some varying portion thereof becomes non-conductive so as to appropriately reduce the area of their opposed conductive faces.

It is yet another object of the invention to utilize the dynamic phase change location as a means to appropriately adjust the virtual effective size of the electrodes, in essence interpreting that dynamic as an electrode that passively and automatically changes its size to accommodate proper current draw and water temperature based on water conductivity and/or water flow.

It is another object of the invention to provide a temperature control valve disposed between the inlet and the outlet of the water heater's housing so as to provide a means to lower the outlet temperature of the water to below the PTC temperature of the material.

It is yet another object of the invention to restrict the flow of water through the water heater to a rate that will always allow for the PTC effect to render the electrodes non-conductive.

It is another object of this invention to regulate potentially thousands of amps with no electronic components. While the invention at first appears to defy the laws of physics by regulating its potential amperage draw without increasing its heat proportionally, as in the case of variable transformers, it must be understood that it is the load that is modulating itself. The result is a kinetic servo loop. The inverse occurs when the water's conductivity decreases, and an additional dynamic occurs when the flow of water acts upon the electrode's temperature. the complex dynamics of which will become apparent in the detailed description of the invention.

BRIEF DESCRIPTION OF THE INVENTION

An instant water heater according to this invention comprises a heating chamber having an inlet and an outlet. Water to be heated enters the chamber through the inlet, and after being heated, exits through the outlet to a point of use.

A pair of spaced-apart Positive Temperature Coefficient electrodes is mounted in the chamber, so disposed and arranged that an appropriate volume of the water passes between them so as to be heated by current that flows through the water from one electrode to the other.

According to a preferred application of the invention, the precise temperature to which the water is heated is maintained by the addition of an electronic temperature control circuit. A first order temperature is attained by the positive temperature coefficient conductive polymer's phase change temperature and a more precise electronic temperature setting is available to the user. For this specific application of the invention, the Positive Temperature Coefficient electrodes have a phase change temperature tolerance of several degrees F., and therefore are not normally used for laboratory use for fine adjustment of temperature. Their purpose is to regulate the water to an acceptable first order temperature, and regulate current draw in amps. A potentiometer dial setting can be adjusted to the desired fine temperature to within less than one degree F., or finer.

In most applications the order of magnitude to which the PTC electrodes can control temperature will be acceptable, thereby negating the need for any electronic controls.

According to this invention the Positive Temperature Coefficient electrodes are principally formed of, and their exposed surfaces are specifically made of, either an electrically conductive ceramic or polymeric resin.

According to a preferred but optional feature of the invention, the polymer electrode is loaded with graphite or graphite nodules, fibers, fibrils and/or nano-fibers to reduce the bulk electrical resistance of the material and provide suitable conductivity for the electrode.

The Positive Temperature Coefficient (PTC) of the polymer relates to the temperature at which the material makes a phase change from electrically conductive to non-electrically conductive. The material maintains its crystalline structure up to its PTC temperature, in most cases around 60 degrees C., wherein it changes to an amorphous condition. This temperature is just short of the polymer's melt/flow point, but low enough where the material maintains the majority of its structural integrity.

When it is below its phase change temperature, conductive graphite strings are inherently connected to form conductive pathways throughout the material. As the phase change temperature is approached, these chains disconnect and carbon "floats" within the amorphous condition of the material. Since this is the point at which no additional electrical current can pass through the material, it ceases to increase in temperature and holds a "tripped" temperature while a maintaining trickle current passes through it. Upon cooling, it returns to its previous crystalline structure whereby the carbon strings reconnect, but never in the exact same string formation as before. Not reconnecting in the exact way makes the material become more resistive the second time it is brought to its phase change temperature. It continues to become more resistive for about 3 or 4 more cycles where it then stabilizes to a resistance that will endure thousands, perhaps hundreds of thousands of cycles.

Since the PTC temperature of the polymeric material, or ceramic material is typically higher than a normally desired water temperature, say for a shower or washing hands, a water temperature control channel is molded into the main housing of the water heater, disposed between and connecting the water inlet to the hot water outlet. This allows for cold water to bypass the heating chamber and mix directly with the exiting hot water. Perpendicular to this molded channel is a threaded needle valve used for controlling the amount of cool water to be mixed.

The above and other features of this invention will be fully understood from the following detailed description and the accompanying drawings, in which:

DETAILED DESCRIPTION OF THE INVENTION

Although this invention contemplates a number of physical arrangements for effective heating and for regulation of electrical current so as not to induce undesirable harmonics that can over heat electrical wiring, the principal advantages of this invention are derived from the use of unique PTC electrodes which they all use.

Figure 1:
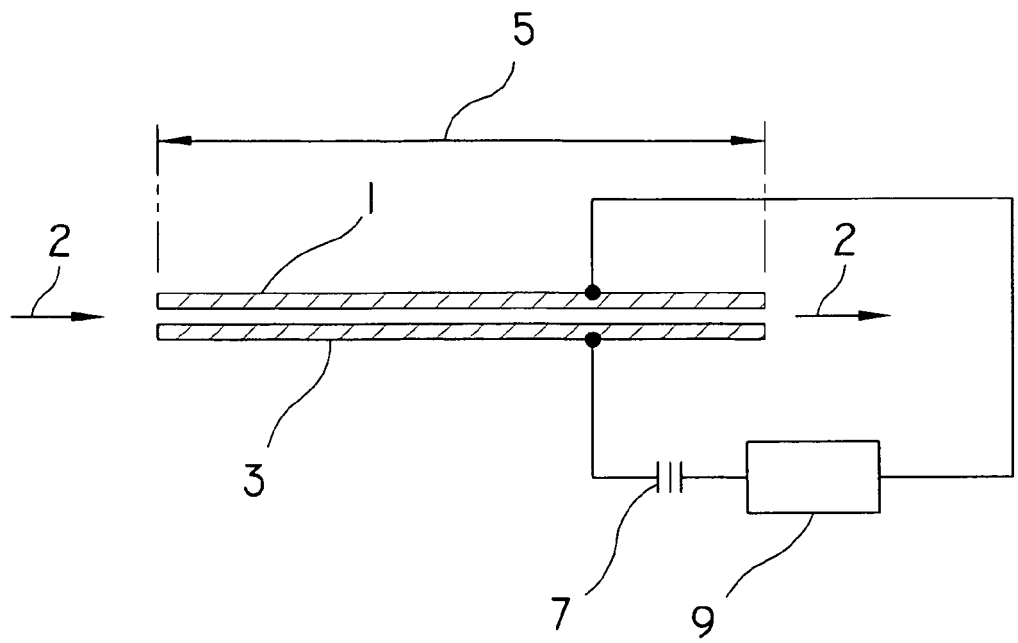
FIG. 1 is a schematic drawing showing the basic components of an electrode water heater.

A basic schematic of a prior art electrode water heater is shown in FIG. 1 (Prior Art). Water flows 2 between two electrodes 1,3 while power 7 is regulated by way of an electronic circuit 9 to provide a pre-selected water temperature based on a combination of the water's electrical conductivity and the area of the opposed faces 5 of said electrodes 1,3.

Figure 2:
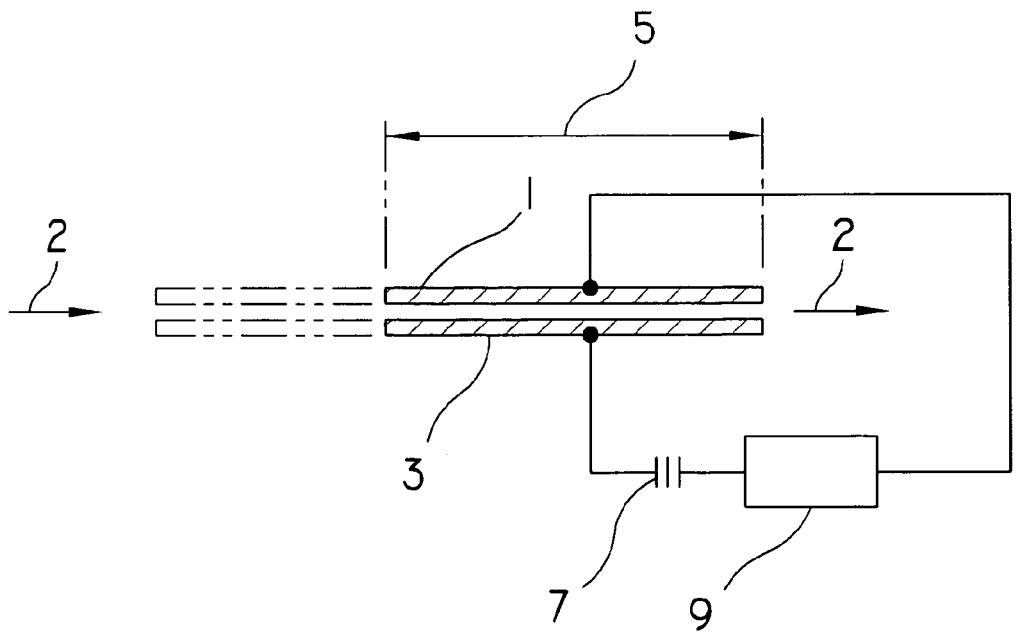
FIG. 2 is a schematic drawing showing an electrode water heater with its electrodes reduced in size to accommodate highly conductive water.

Should the water conductivity become extremely high, a solution shown in FIG. 2 (Prior Art) for stopping a over-current condition would be to shorten the electrodes thereby reducing the area of their said opposed faces 5 such that it would better match the available power to the water's conductivity. However, should the water's conductivity drop, it is impossible to put the material back. This illustration, although simplistic, will be more appreciated as the PTC effect on this invention is further understood.

Figure 3:
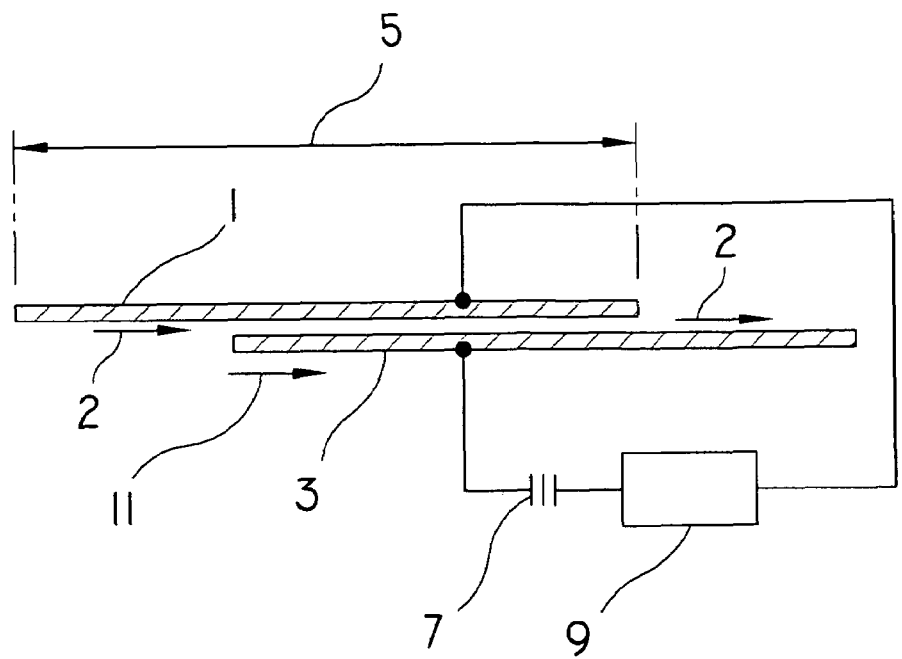
FIG. 3 is a schematic drawing showing a method of reducing the area of opposed face of electrodes without reducing their size.
Figure 4:
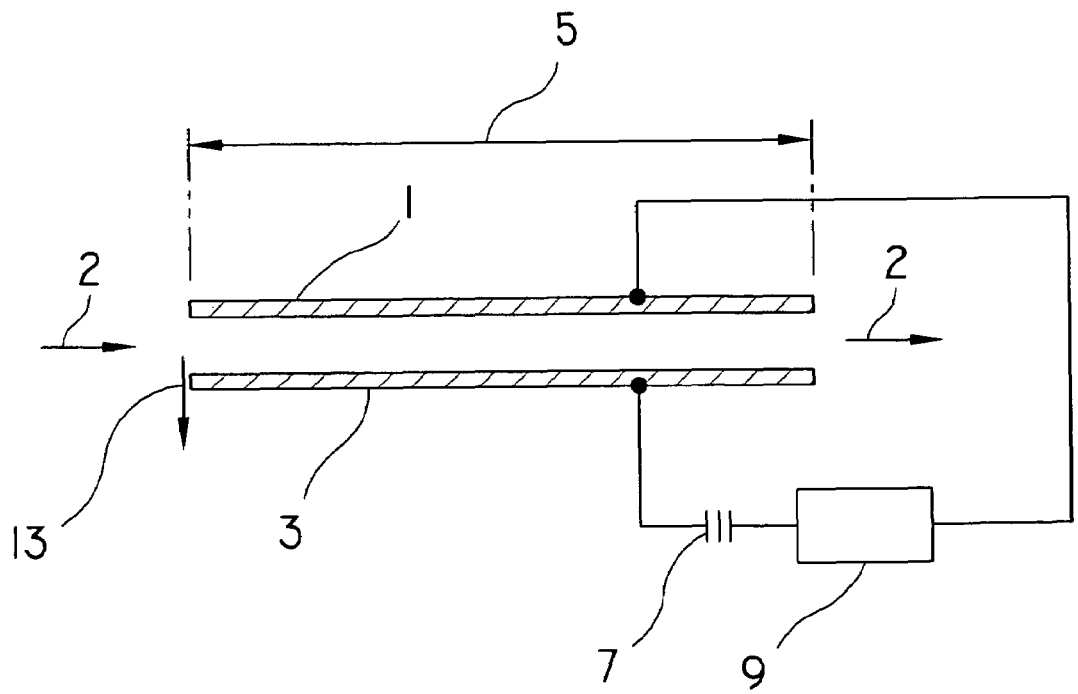
FIG. 4 is a schematic drawing showing greater spaced apart electrodes as an alternate method of accommodating high conductivity water without reducing their size.

Since it is not possible nor practical to dynamically change an electrode's length, another scheme is suggested in FIG. 3 (Prior Art) involving moving one electrode 3 in relation to the other, thereby reducing the area of said opposed face 5 to a much smaller area. Another option shown in FIG. 4 suggests separating electrodes 1 and 3 thereby reducing the amount of current deployed into the water.

Figure 5:
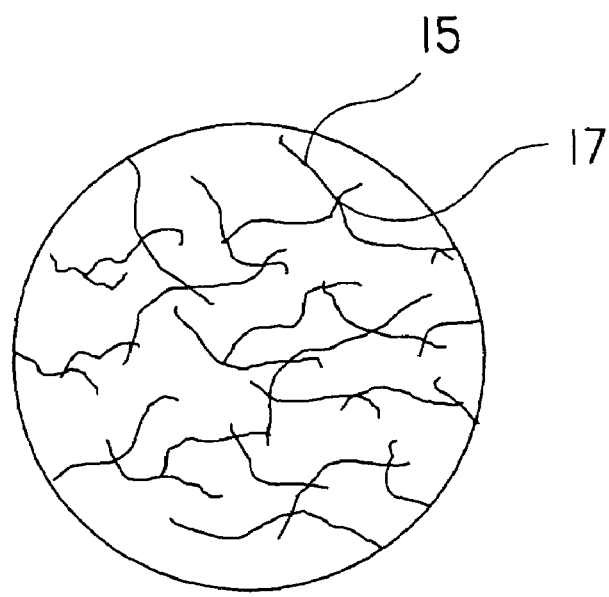
FIG. 5 illustrates a microscopic view of carbon fibers contacting each other within the microstructure of a polymeric Positive Temperature Coefficient conductive polymer when it is below its phase change temperature.
Figure 6:
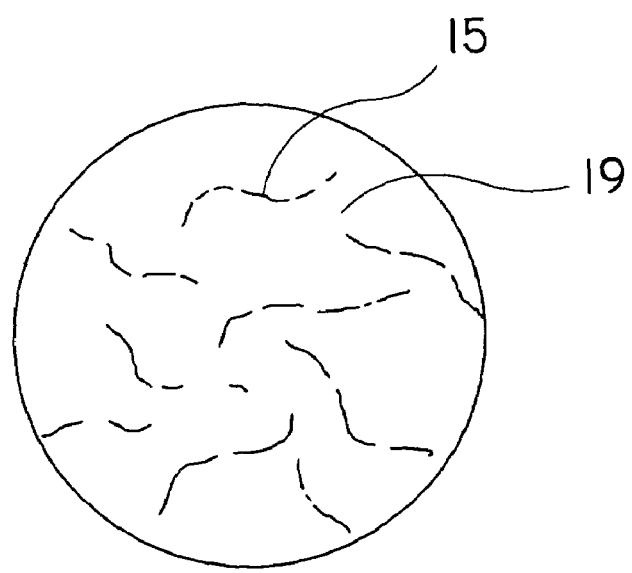
FIG. 6 illustrates a microscopic view of carbon particles with gaps between them within the microstructure of positive temperature coefficient conductive polymer when it is above its phase change temperature.

Positive Temperature Coefficient Polymers are loaded with distinctive carbon and graphite particulates ranging from carbon black, one of the most common, to carbon fibrils one of the most recently invented forms of carbon. In essence, the basic theory behind the PTC effect is that any crystalline polymer will experience a PTC effect when it reaches its softening temperature. FIG. 5 shows conductive graphite strings 15 that touch or connect to other strings 17 that form conductive pathways throughout the material. As the material passes through its phase change temperature, said strings 15 shown in FIG. 6 disconnect as shown at 19, and the gaps disallow electrical conductivity therefore increase the material's electrical resistance. Certain mixes become completely non-conductive at a temperature that, to a certain degree, can be controlled.

Figure 7:
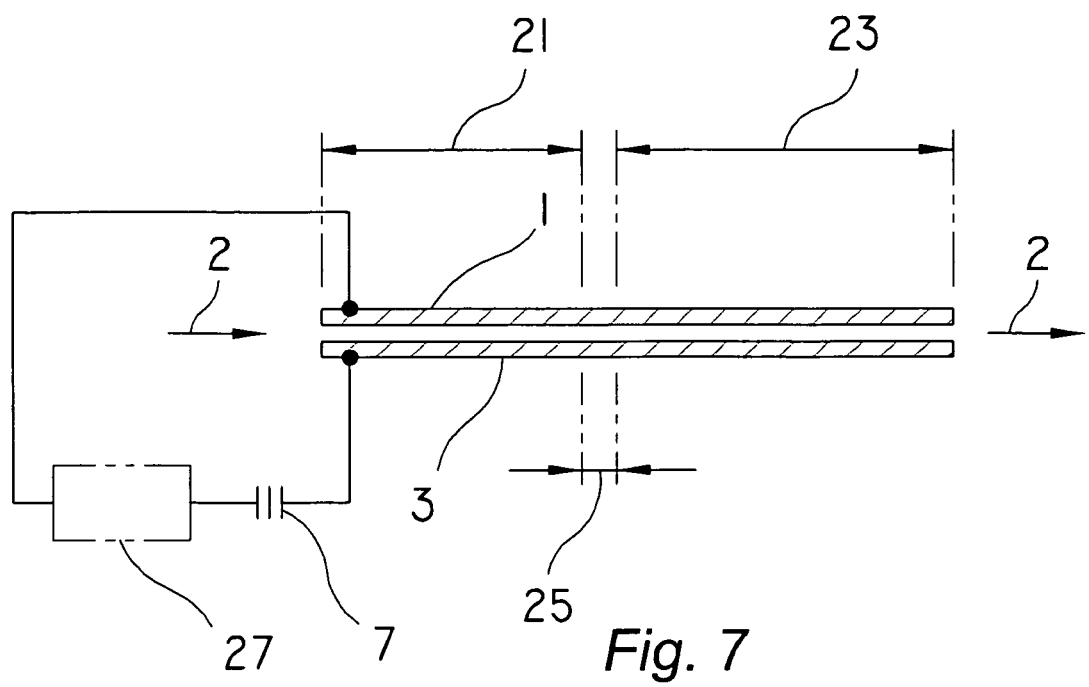
FIG. 7 is a schematic drawing showing a conductive portion, a phase change point and a non-conductive portion of a positive temperature coefficient conductive polymer when in use as an electrode within an instant water heater.

An improved and simplified scheme of the invention is shown in FIG. 7. In cases where close or critical temperatures are required, the current is controlled with electronic circuitry 27 and typical proportional, integral and derivative (PID) math is employed for tight servo-loop control using thermistors or other temperature sensing devices.

For domestic or commercial use of hot water, said electronic circuitry 27 is not necessary when taking advantage of the PTC effect of the electrodes of this invention to joule heat water. In these, water flows 2 between said electrodes 1,3 while power 7 is applied to them. It is understood that in FIG. 7, this is a medium flow rate of a common faucet and although this can vary greatly from faucet to faucet, for illustrating the value of the PTC effect on the invention, we shall call this flow rate 1 gallon per minute. As water 2 makes its way through the heater between said electrodes 1,3, its temperature increases because it is contained between and within a conductive path length 21 of said electrodes 1,3. Upon reaching the PTC temperature of said electrodes 1,3, said water no longer continues to heat. Said conductive path length 21 terminates at the location 25 of the phase change temperature of said electrodes 1,3. The remaining non-conductive path length of said electrodes 1,3 is heated by the already hot water of said conductive path length 21 and also by some residual current passing through said electrodes 1,3. These two sources of heat energy maintain the remaining said non-conductive path length 23 of said electrodes 1,3 at or above its PTC temperature. Therefore, the remaining said non-conductive path length 23 of said electrodes 1,3 discontinues its joule heating of the water because it is no longer conductive.

Figure 8:
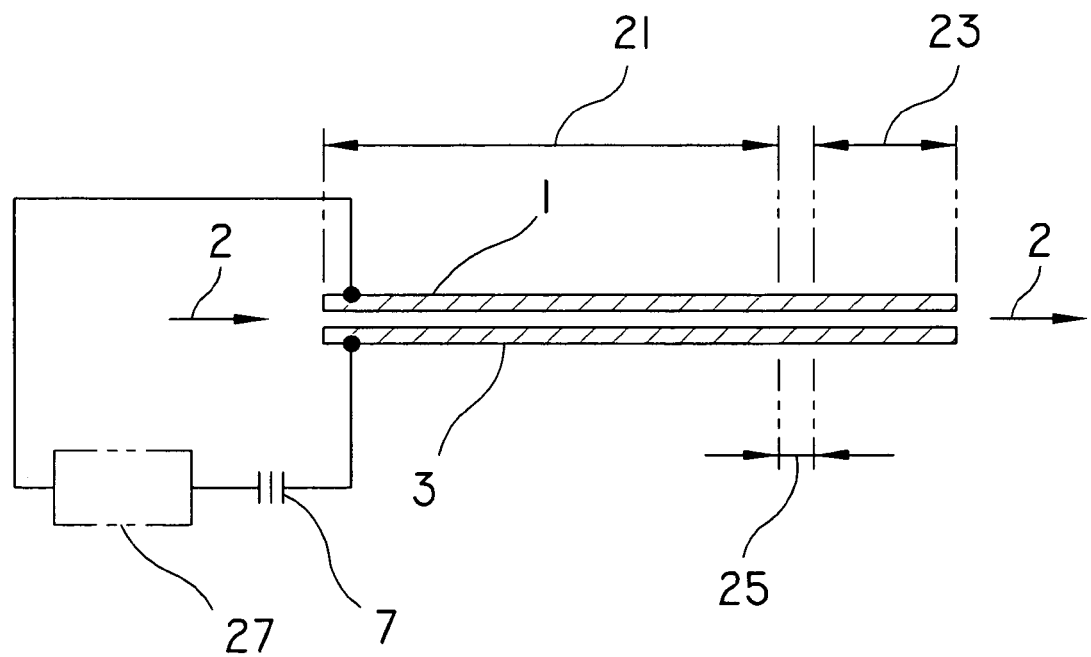
FIG. 8 is a schematic drawing showing that the phase change point of the electrodes has shifted toward the outlet of the water heater during an increased flow of water, a decrease of water conductivity, a lowering of the current draw via its electronic controls, or any combination thereof.

As said water flow 2 doubles, using the illustrative value of 2 gallons per minute, FIG. 8 shows that the said conductive path length of water 21 increases in length in comparison to FIG. 7, moving away from the water heater's inlet and toward its outlet. The said PTC phase change 25 location remains at the same temperature as in FIG. 7, but has moved because the flow has increased and has cooled the said conductive path length of water 21 in a proportional manner. Since the said water flow 2 has increased by 100%, it takes 100% more energy to elevate the water temperature to the PTC temperature. Therefore, said conductive path length 21 of said conductive electrodes 1,3 has doubled. However, the water output temperature remains the same, essentially the electrode's PTC temperature.

Figure 9:
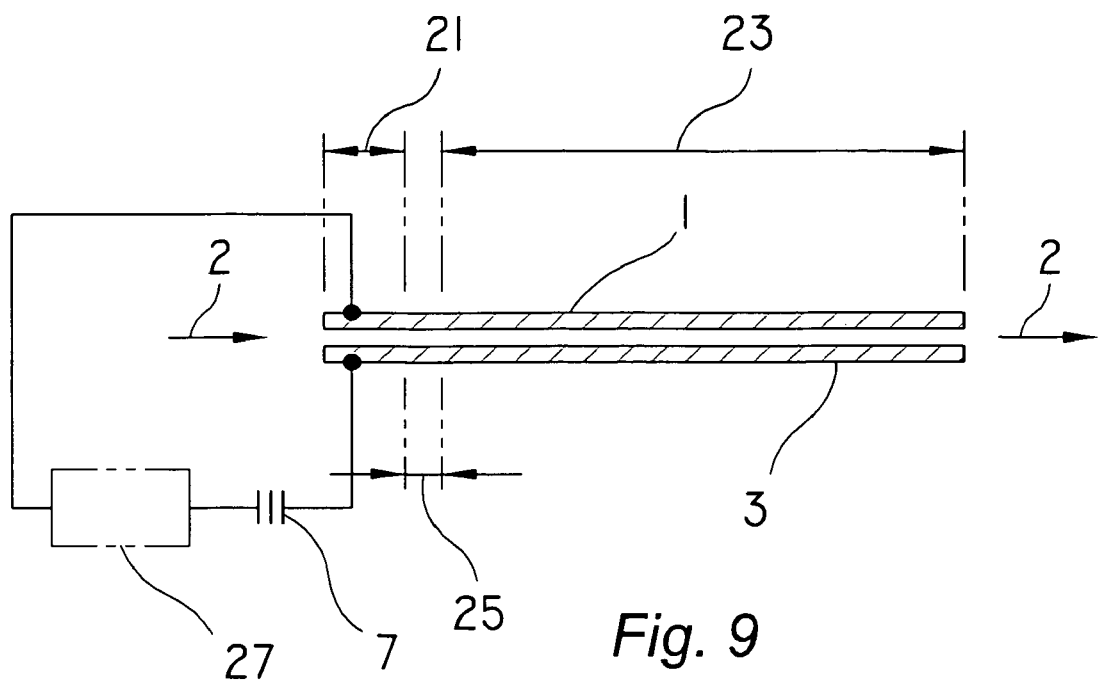
FIG. 9 is a schematic drawing showing the phase change point of the electrodes very close to the inlet of the water heater indicating extremely high conductivity water, or very low water flow or combination thereof.

As water flow is halved, using the illustrative value of ½ gallon per minute, FIG. 9 shows that the said conductive path length 21 decreases in length in comparison to FIG. 7, moving toward the water heater's inlet and away from its outlet. The said PTC phase change 25 location remains again at the same temperature as in FIG. 7, but has moved because the flow has now decreased and the said conductive path length of water 21 has heated in a proportional manner. Again, but conversely, since the flow has decreased by 50% it takes 50% less energy to elevate the water temperature to the PTC temperature. Therefore, the said conductive path length 21 of said conductive electrodes 1,3 has been halved and again, the output temperature remains the same, essentially the electrode's PTC temperature.

It will be observed that an identical, but inverse result as described for water flow occurs with variation in water conductivity.

As water conductivity lowers by 50% using the illustrative value of 1 gallon per minute, FIG. 8 shows that the said conductive path length of water 21 increases in length in comparison to FIG. 7, moving away from the water heater's inlet and toward its outlet. The said PTC phase change 25 location remains at the same temperature as in FIG. 7, but has moved because the waters conductivity has decreased and the flowing water has cooled the said conductive path length of water 21 in a proportional manner. Since the said water conductivity has decreased by 50% it takes 100% more path length to elevate the water temperature to the PTC temperature. Therefore, said conductive path length 21 of said conductive electrodes 1,3 has doubled. However the water output temperature remains the same, essentially the electrode's PTC temperature.

As water conductivity doubles, using the illustrative value of an unchanged 1 gallon per minute, FIG. 9 shows that the said conductive path length 21 decreases in length in comparison to FIG. 7, moving toward the water heater's inlet and away from its outlet. The said PTC phase change location 25 remains again at the same temperature as in FIG. 7, but has moved because the waters conductivity has now increased and the said conductive path length of water 21 has heated in a proportional manner. Again, but conversely, since the water conductivity has increased by 100% it takes 50% less path length to elevate the water temperature to the PTC temperature. Therefore, the said conductive path length 21 of said conductive electrodes 1,3 has been halved and again, the output temperature remains the same, essentially the electrode's PTC temperature.

The complex dynamics of water conductivity and flow for electrode water heaters has been expensive and difficult for regulating output temperature. This invention passively compensates for both critical aspects of electrode water heating.

Figure 10:
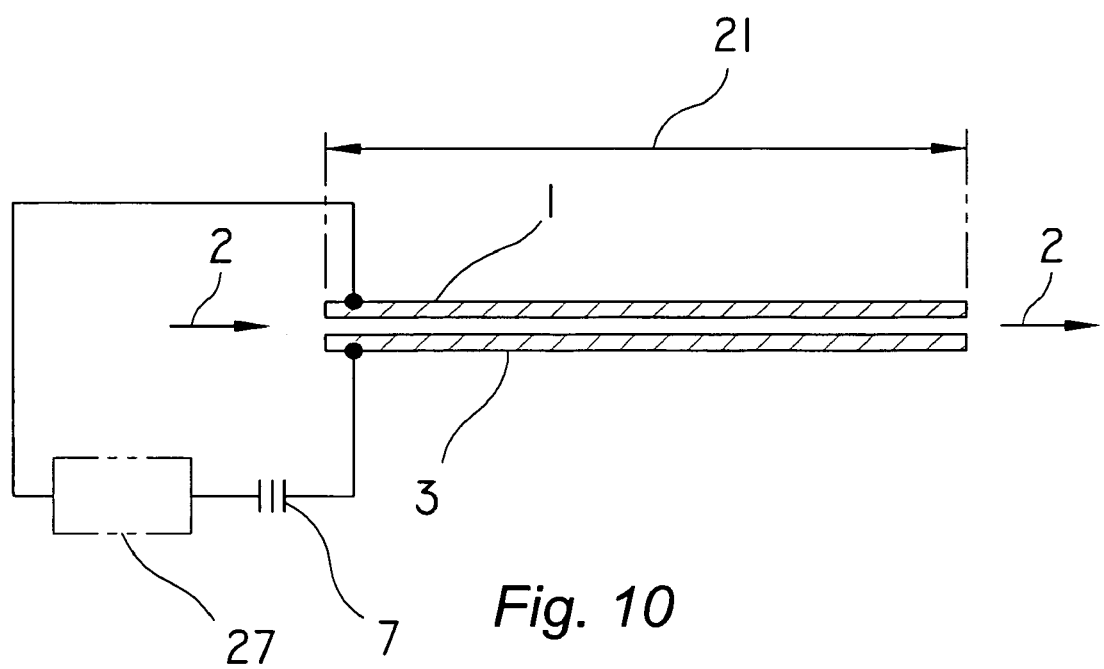
FIG. 10 is a schematic drawing showing the positive temperature coefficient state, meaning its entire temperature is below its phase change temperature.
Figure 11:
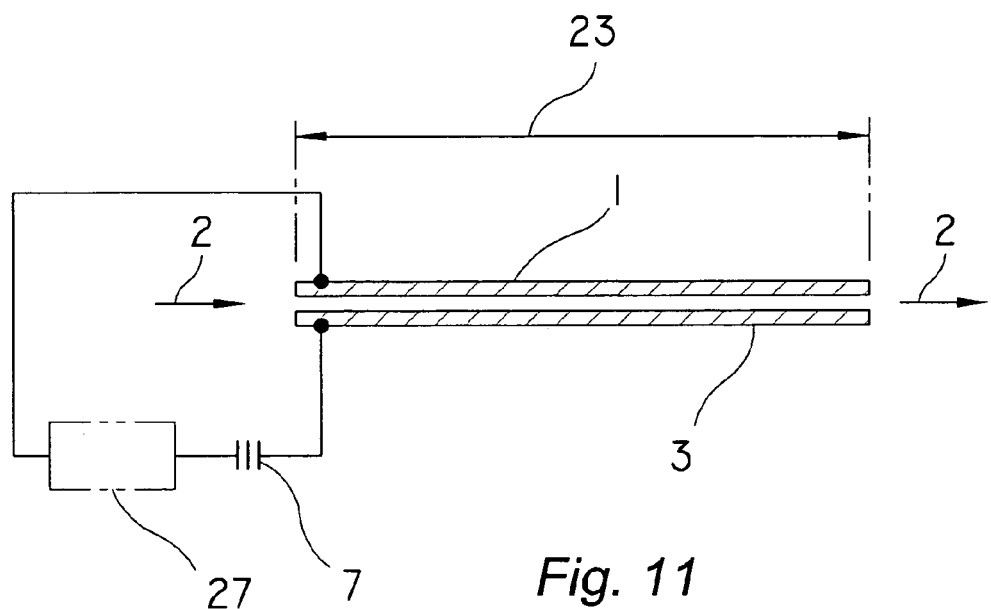
FIG. 11 is a schematic drawing showing the positive temperature coefficient polymer electrode in a totally non-conductive state meaning its entire temperature is above its phase change temperature.

Of course, there are limits to the dynamics of the invention. However, when said electrodes 1,3 are sized properly in relation the variations in water conductivity that is available from United States and other water infrastructures, acceptable flow rates and available power, the benefits of the invention are far more favorable than the prior art. FIGS. 10 and 11, although similar in appearance, illustrate these limits and the safety inherent in the invention. When water enters at a flow rate above what the available power can heat, the entire said flow path 21 of said electrodes 1,3 becomes conductive. This is because said water 2 cools the entire said electrodes 1,3 to below their PTC temperature. Conversely, in FIG. 11, the said non-conductive path length 23 entirely encompasses said electrodes 1,3 rendering them into a non-conductive condition when the water is shut off, or the flow is so low that their temperature is elevated to their PTC temperature. In the case where the water is shut completely off, the amount of water remaining inside the water heater is so small in comparison to a standard 40 gallon storage water heater that the stand-by heat loss through the walls of the water heater becomes insignificant.

Figure 12:
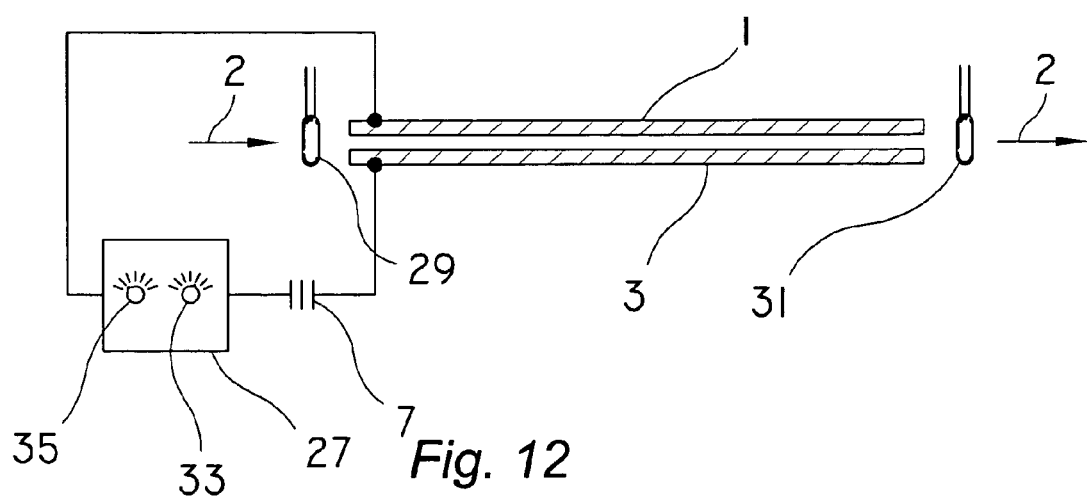
FIG. 12 is a schematic drawing of an instant water heater showing its electrodes, an inlet and outlet thermistor and a control box showing a temperature setting dial and an amperage setting dial.

FIG. 12 is a schematic view of a PTC electrode water heater with added components and electronics used to maintain accurate output temperatures. Water 2 flows past an inlet thermistor 29, between said electrodes 1,3, is heated and its temperature measured by an outlet thermistor 31. The electronics illustrated as item 27 of FIG. 12 can be designed and adapted by any competent electronics engineer. There are two user controls 35,33 that are unique to the invention and are noteworthy. These consist of a current limit knob 35 that is used to limit the amount of current that can be drawn by the water heater and an outlet water temperature knob 33 used to set the temperature of the water.

Figure 13:
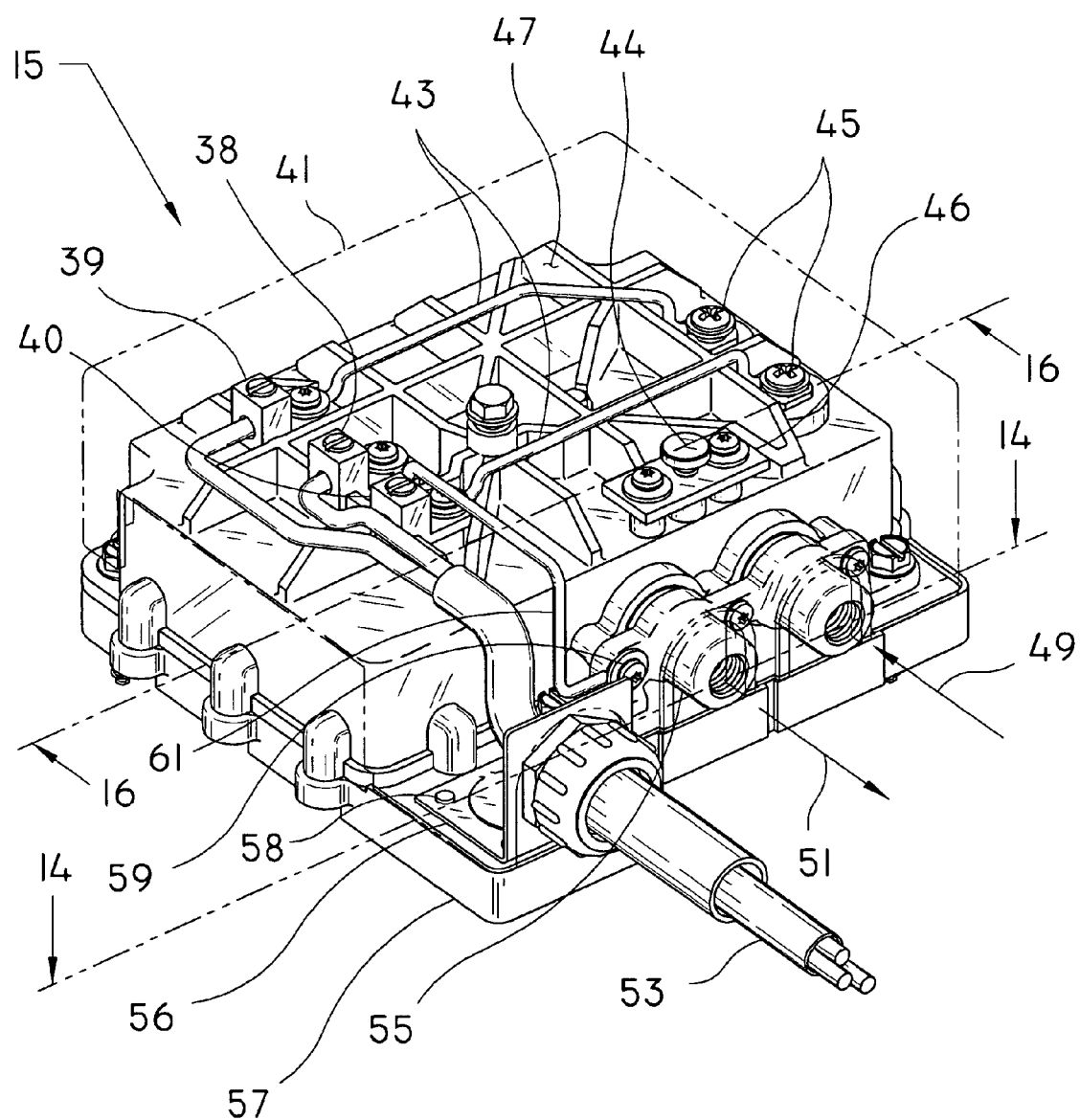
FIG. 13 is a perspective view illustrating the water heater with its cover shown in phantom lines.

In FIG. 13, the instant PTC water heater 15 is shown in perspective view with its plastic injection molded cover 41 removed and outlined in phantom. A main housing 47, a bottom cover 57 and an inlet/outlet manifold 55 comprise the major components of the instant PTC water heater. Water enters 49 at the inlet side of said manifold 55 and exits 51 at the outlet side of manifold 55.

An electrical cord 53 is secured to its three respective lugs, namely the power lugs 39,40, and a grounding lug 40. A wire 61 is run from said grounding lug 38 to said manifold 55 and attached with a screw 59. Two wires run from said power lugs 30,40 to the electrode connections 45. An angle bracket 56 is disposed on the top face of said bottom cover 57 and staked in place via protruding molded-in studs. A throttle screw 44 is threaded into a retaining plate 46 with matching threads. Turning said knob 44 allows an adjustment for cool inlet water to mix with the hot water thereby adjusting the outlet water temperature. The details of which are shown in greater detail in FIG. 16.

Figure 14:
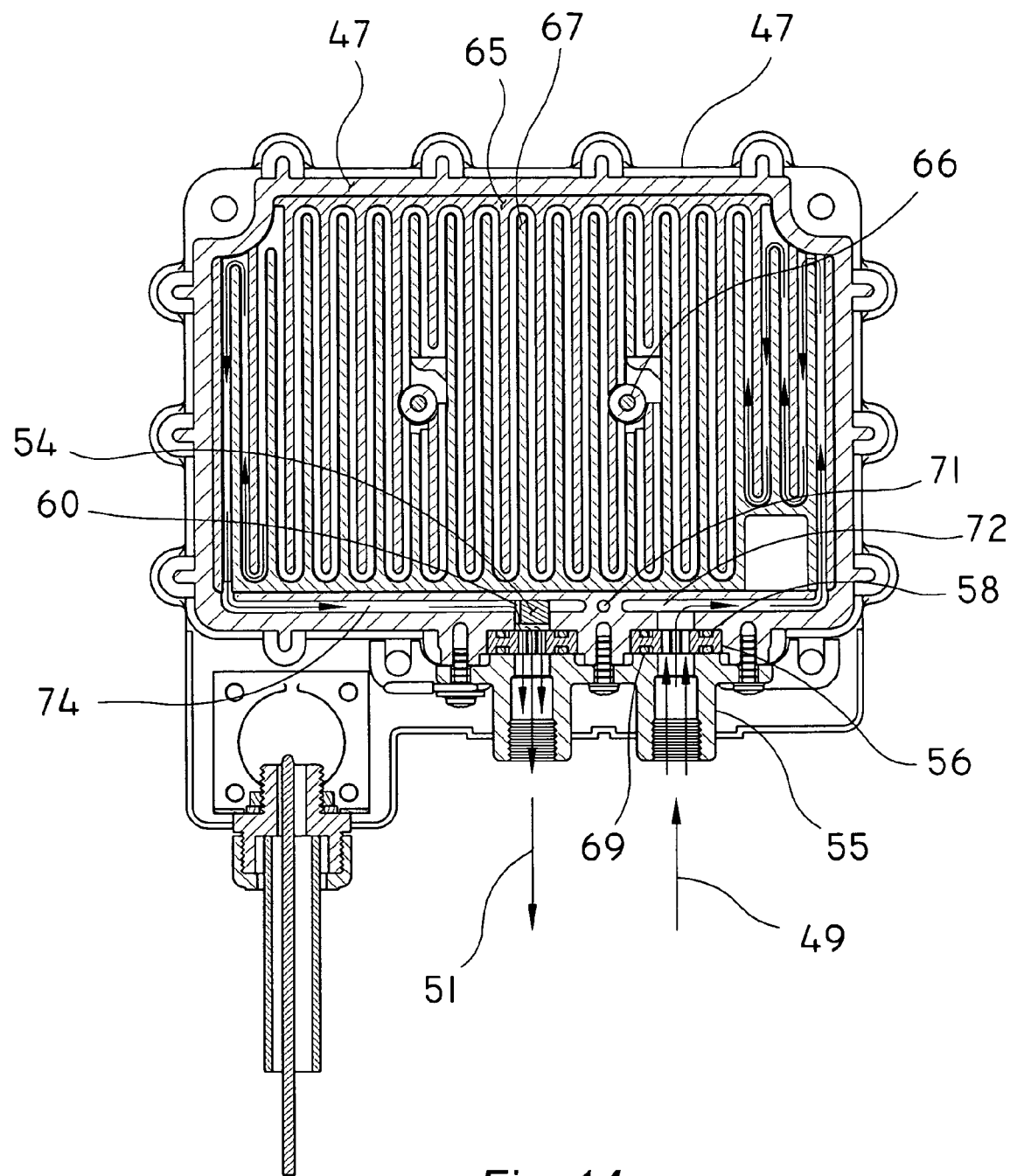
FIG. 14 is a section view showing the waters flow path through the heater, from the inlet, through the inlet ground screen, through and between the blades of the electrodes, through the outlet grounding screen and out its outlet.

FIG. 14 constitutes a section view of the embodiment of FIG. 13 that shows heating of the water. The water inlet flow 49 entering said inlet manifold 55 and passing through a conductive plastic inlet screen 58 through a molded-in channel 72 in said main housing 47 and between the two electrodes 65,67. The water takes a circuitous route between said electrodes 65,67 during which it is joule heated by electrical current passing through it. It exits through a molded-in channel 74 of said main housing 47 and past a restriction orifice 54. Restriction orifice 54 is sized so that its flow rate limits the amount of water passing through the water heater. Limiting the flow insures that the performance of the water heater meets a specific rated temperature rise. It also insures that higher flow rates do not cool the electrodes while passing potentially high conductivity water that may draw excessive current. The said restriction orifice 54 limits the flow so that the PTC effect of said electrodes 65,67 will reach non-conductivity before exceeding the line's circuit breaker rating.

Figure 15:
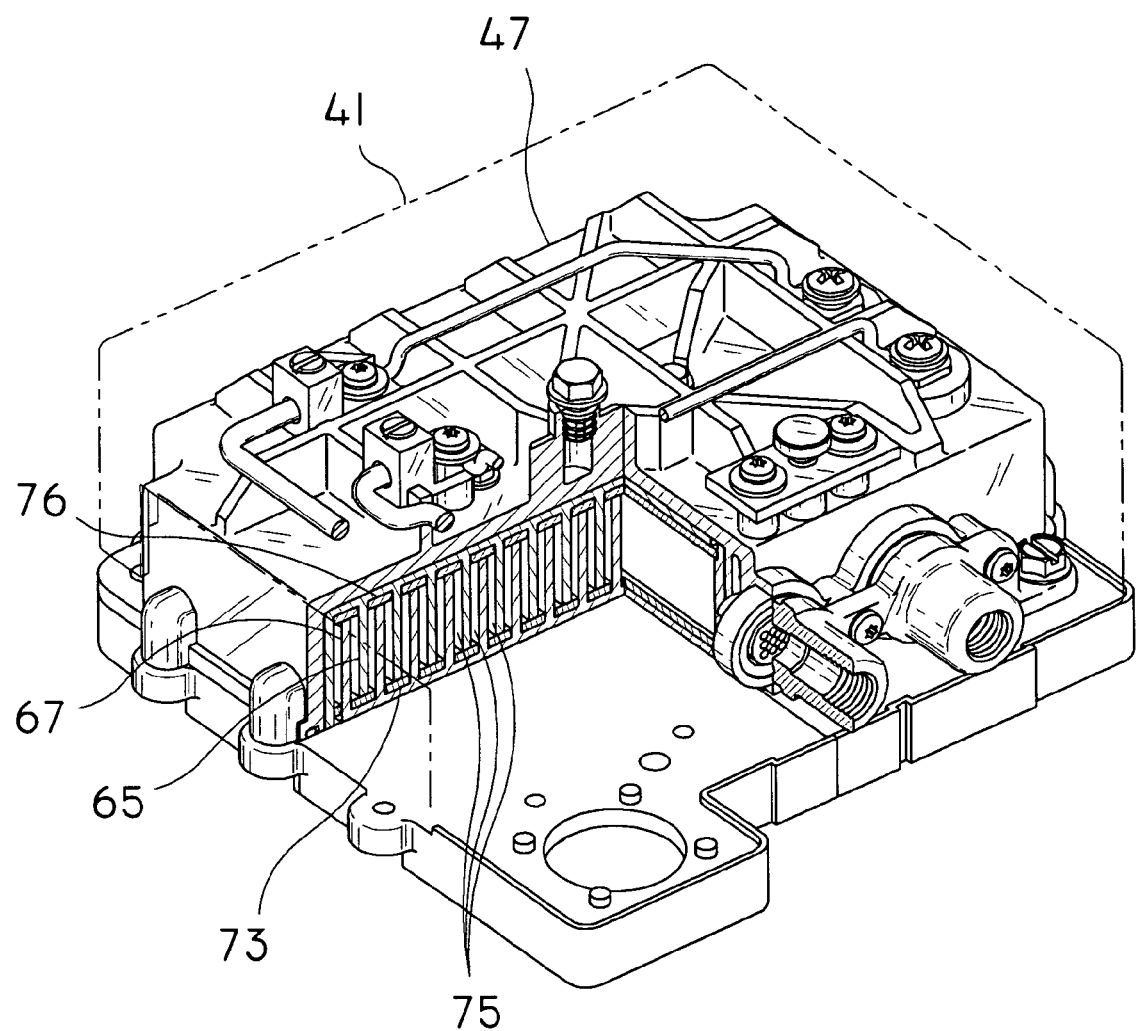
FIG. 15 is a perspective section view which shows the upper and lower electrodes and spacer pieces that direct the water in a predetermined circuitous path between their blade.

FIG. 15 shows a cut-away of the corner of the embodiment of FIG. 13 illustrating said main housing 47, and said electrodes 65, 67. The water maintains a circuitous path between the blades of electrodes 65,67 and does not spill over or under said blades, plastic spacers 73,76 are disposed between said electrodes 65,67. These plastic spacers 73,76 forcibly route the water only in the spaces 75 between the blades of said electrodes 65,67. This long linear path length facilitates the creation of a clear and concise place as shown in FIG. 7 at which said PTC effect 25 is located within the total water path length.

Figure 16:
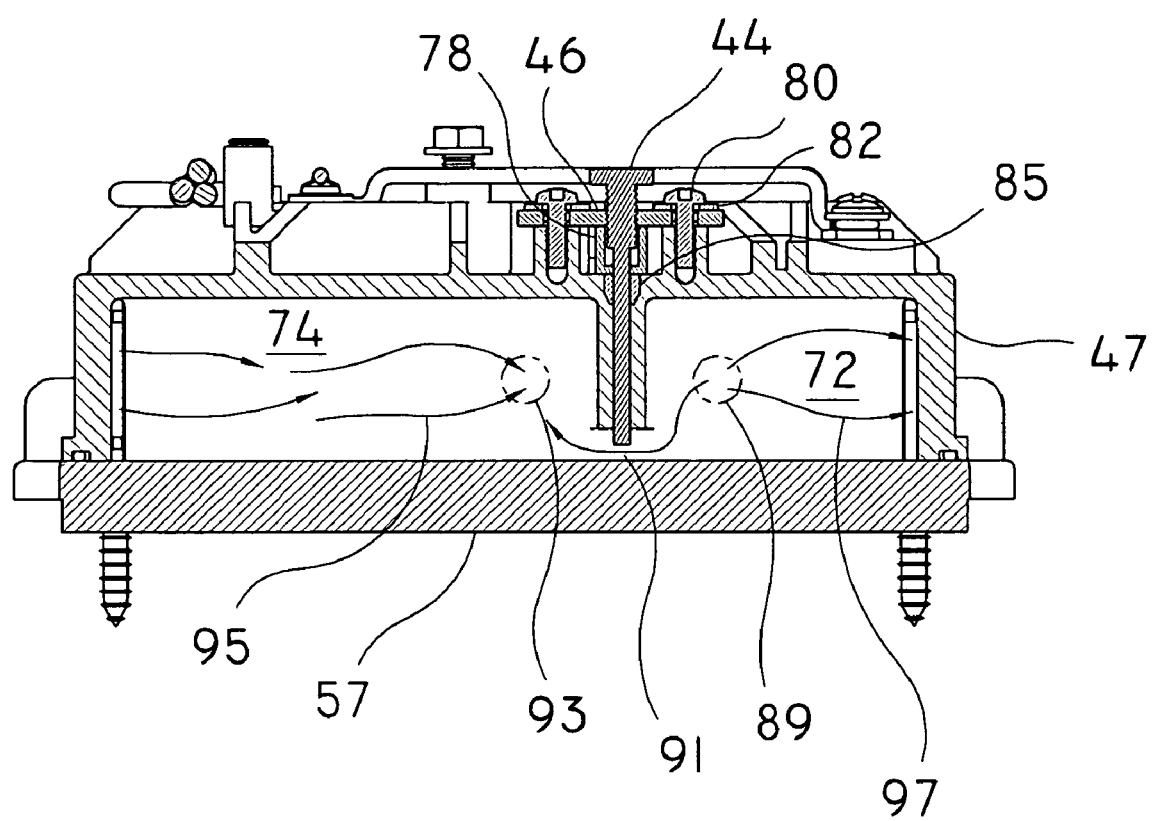
FIG. 16 is a section view of the water heater's inlet and outlet locations in phantom while illustrating the needle valve that bleeds cool inlet water over to the outlet port to achieve a desired lower outlet water temperature.

FIG. 16 is a section view of a more refined embodiment of FIG. 13. It shows said throttling screw 44 threaded into said retaining plate 46. Retaining plate 46 is fastened to main housing 47 with screws 80 and washers 82. A seal retaining cup 78 is disposed between retaining plate 46 and main housing 47 to compress resilient seal 85 against a smooth portion of throttling screw 44 so as to seal against leakage. Throttling screw 44 adjusts the water temperature to a desired temperature by increasing or decreasing the space 91 between its end and the surface of bottom housing 57. In operation, water enters molded-in channel 72 through inlet orifice 89, whereby most of the flow 97 is directed between said electrodes. An adjustable percentage flows past said throttling screw 44 through opening 91 and mixes with exiting hot water 95 leaving the water heater through exit orifice 93 at the desired water temperature.

Figure 17:
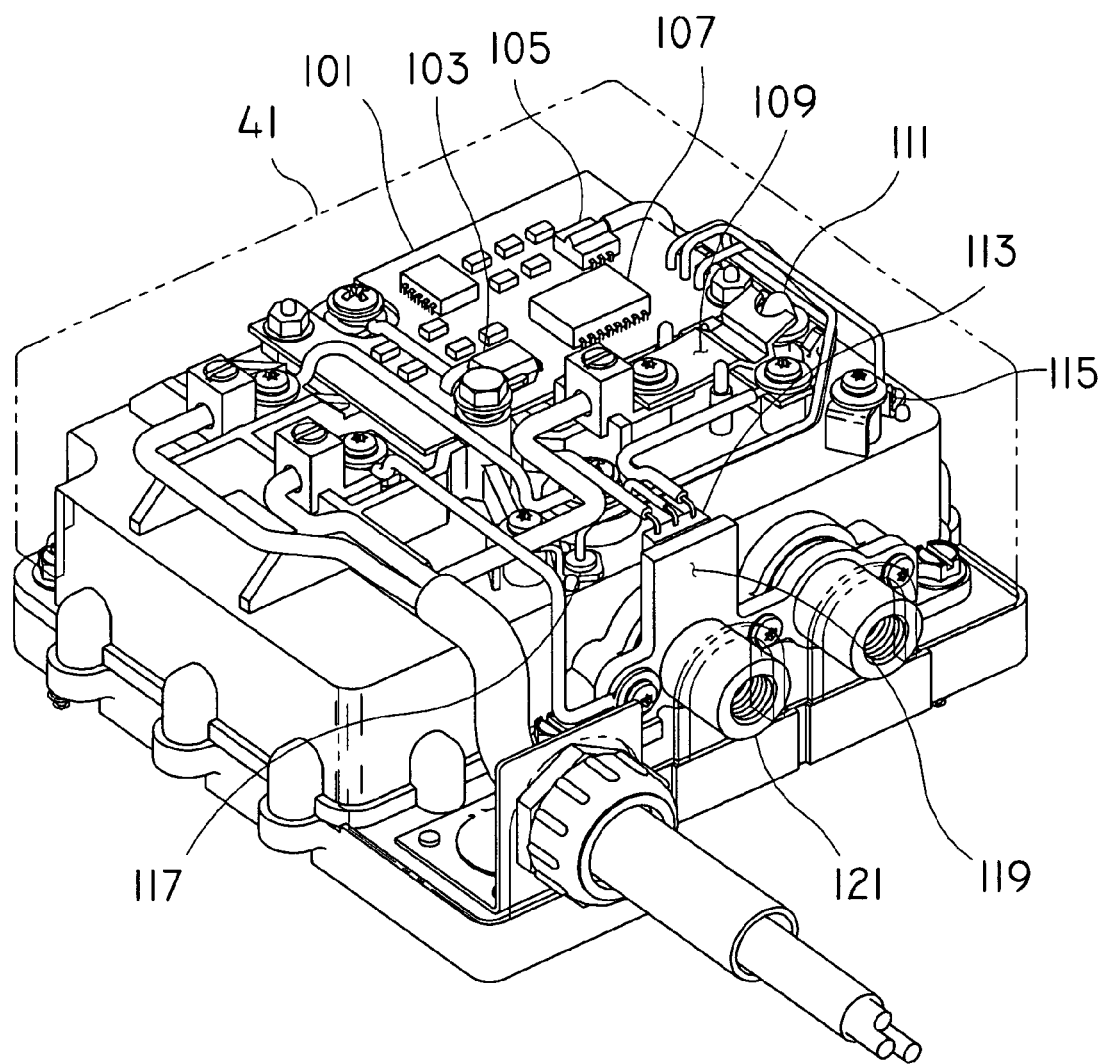
FIG. 17 is a perspective view of an optional variation of the PTC water heater with electronic printed circuit board, inlet and outlet thermistors, said water heater being the type used in laboratories or any use where temperature requires critical temperature regulation.

The object of this invention is not to define the operation of electronics required to regulate a PTC plastic electrode water heater, but to include the optional embodiment of controlling temperature more accurately through the use of electronics. FIG. 17 is an alternate embodiment of FIG. 13 showing a printed circuit board 101. Printed circuit board with the electronics 101 serve to regulate the temperature of the water in use to within smaller temperature tolerances. Such an embodiment requires that it incorporate a pressure sensing device 105 that when in operation senses a pressure drop which activates said electronics. A current sensing device 103 provides input to a microprocessor 107 that triggers the proper firing angle of the AC sine wave by way of triac 113 that is heat-sink mounted to a face 119 of the inlet/outlet manifold 121. An inlet thermistor 117 provides input to the microprocessor when the flow of water stops by its increase in temperature. An outlet thermistor 115 provides input to the microprocessor by measurement of the output temperature of the water.

This invention is not to be limited by the embodiments shown in the drawings and described in the description, which are given by way of example and not of limitation, but only in accordance with the scope of the appended claims.

I claim:

1. A pair of spaced-apart confronting electrodes for joule heating water that contacts and extends between both of them, whereby electrical current from one electrode to the other joule heats the water; at least one of said electrodes comprises a polymer characterized by lower electrical resistivity at lower temperatures, by having a positive temperature coefficient whereby said one electrode substantially loses its electrical conductivity and becomes non-conductive or nearly non-conductive at a higher temperature at which said polymer undergoes a phase change from crystalline to amorphous, whereby to reduce or to prevent flow of electrical current through it at and above an intended water temperature, said one electrode being exposed to the heated water for itself to be heated to said temperature by said water.

2. An electrode according to claim 1 in which said one electrode incorporates electrically conductive carbon graphite nodules, or carbon fibers, or carbon fibrils, or carbon nano-tubes, or lamp black or carbon graphite or a combination of any two or more of these, mixed throughout to provide said positive temperature coefficient.

3. Apparatus according to claim 1 in which both of said electrodes possess the recited characteristics of said one electrode.

4. Apparatus according to claim 2 in which both of said electrodes posses the recited characteristics of said one electrode.

5. In combination: a pair of electrodes according to claim 1; and
an enclosure containing said water to be heated by current flowing through said water from one said electrode to the other electrode.

6. An instant water heater comprising:
a housing having an inlet, an outlet, and a flow path for water entering between said inlet and said outlet;
a pair of electrodes including at least one electrode according to claim 1, both electrodes being contacted by water flowing past and between both of them; and
electrical connections to said electrodes to supply electric current to them.

7. An instant water heater according to claim 6 in which said one electrode has a positive temperature coefficient phase change location which moves within said electrode according to a change in water flow rate in order to maintain a constant temperature.

8. An instant water heater according to claim 6 in which said one electrode has a positive temperature coefficient phase change location which moves within said electrode according to a change in water conductivity in order to maintain a constant water temperature.

9. An instant water heater according to claim 6 in which water flow control means controls the rate of flow of water between said electrodes.

10. An instant water heater according to claim 6 in which said means diverts part of said water stream away from said electrodes, thereafter to dilute heated water that passed between the electrodes to provide water at an intended temperature.

11. An instant water heater according to claim 6 in which both of said electrodes possess the recited charactertics of said one electrode.

* * * * *